(12) United States Patent
Chen et al.

(10) Patent No.: US 9,574,128 B2
(45) Date of Patent: Feb. 21, 2017

(54) POLYMER DELIVERY IN WELL TREATMENT APPLICATIONS

(75) Inventors: Yiyan Chen, Sugar Land, TX (US); Lijun Lin, Sugar Land, TX (US); Philip F. Sullivan, Bellaire, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1312 days.

(21) Appl. No.: 12/166,804

(22) Filed: Jul. 2, 2008

(65) Prior Publication Data

US 2009/0023615 A1 Jan. 22, 2009

Related U.S. Application Data

(60) Provisional application No. 60/959,836, filed on Jul. 17, 2007, provisional application No. 61/054,277, filed on May 19, 2008.

(51) Int. Cl.
| | |
|---|---|
| *C09K 8/60* | (2006.01) |
| *C09K 8/68* | (2006.01) |
| *C09K 8/70* | (2006.01) |
| *C09K 8/90* | (2006.01) |

(52) U.S. Cl.
CPC ............... *C09K 8/68* (2013.01); *C09K 8/685* (2013.01); *C09K 8/70* (2013.01); *C09K 8/90* (2013.01)

(58) Field of Classification Search
None
See application file for complete search history.

(56) References Cited

U.S. PATENT DOCUMENTS

| | | | |
|---|---|---|---|
| 4,425,241 A | 1/1984 | Swanson | |
| 4,795,772 A | 1/1989 | Hsieh | |
| 6,169,058 B1 | 1/2001 | Lee | |
| 6,489,270 B1 | 12/2002 | Vollmer | |
| 6,818,597 B2* | 11/2004 | Harris | 507/136 |
| 7,151,078 B2 | 12/2006 | Zaroslov | |
| 7,287,588 B2 | 10/2007 | Zaroslov | |
| 7,628,202 B2* | 12/2009 | Meyer | 166/249 |
| 2004/0072698 A1 | 4/2004 | Zaroslov | |
| 2004/0216880 A1* | 11/2004 | Tutuncu et al. | 166/301 |
| 2007/0123431 A1* | 5/2007 | Jones et al. | 507/209 |

FOREIGN PATENT DOCUMENTS

| | | |
|---|---|---|
| EP | 0358385 A2 | 3/1990 |
| GB | 2172008 A | 9/1986 |
| JP | 61225275 A | 10/1986 |
| JP | 61225276 A | 10/1986 |

* cited by examiner

*Primary Examiner* — John J Figueroa
(74) *Attorney, Agent, or Firm* — Andrea E. Tran (57) ABSTRACT

This invention relates to compositions and methods for treating subterranean formations, in particular, oilfield stimulation compositions and methods using water-in-water polymer emulsions to uniformly dissolve a rheologically active polymer, such as a thickener or friction reducer, in the treatment fluid. The emulsions have a low viscosity and are easily pumped for mixing into a treatment fluid, where upon dilution with an aqueous medium, the polymer is easily hydrated without forming fish-eyes. The partitioning agent in the water-in-water emulsion does not generally affect the rheology of the treatment fluid. The invention also relates to further processing of the emulsion by wet grinding, high shear mixing and/or heating to enhance the hydration rate in the preparation of the well treatment fluid.

11 Claims, 6 Drawing Sheets

POLYMER DELIVERY IN WELL TREATMENT APPLICATIONS

CROSS REFERENCE TO RELATED APPLICATIONS

This application claims priority to and the benefit of U.S. 60/959,836, filed Jul. 17, 2007 and U.S. 61/054,277, filed May 19, 2008.

BACKGROUND OF THE INVENTION

This invention relates to methods for and fluids used in treating a subterranean formation. In particular, the invention relates to the preparation and use of polymer delivery systems in the form of concentrated polymer suspensions useful for creating wellbore fluids and in methods of treating subterranean formations.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like, and are collectively referred to herein as well treatment fluids.

Water-soluble polymers are frequently used for modifying the rheology, e.g. viscosification, proppant suspension, friction reduction, etc., in a number of subterranean formation treatment fluids, including fracturing fluids, wellbore cleanout fluids, gravel pack fluids, and the like. Creating these fluids often involves the steps of dispersing and hydrating polymers, such as guar, cellulose, and derivatives thereof, into a water stream. Hydration of polymers for oilfield applications is generally a slow process. The process normally involves at least a few minutes of agitating the polymer, either a hydrocarbon slurry or dry polymer, with water in a flow path that contains different compartments. Although the process and hydration time has been shortened through multiple efforts in the past decades, it is still not as quick as desired, i.e. reaching above 80% final fluid viscosity in less than 1 or 1.5 minutes. The long hydration time requires the operation to have a specific hydration unit, such as a Precision Continuous Mixer (PCM), on top of a blending unit, such as a Programmable Optimum Density (POD) blender. The equipment and energy costs of this process are high.

Guar powders are generally obtained through a grinding process. The guar particles generally have a twisted, plate-like structure that can be observed under a microscope. Upon contact with water, the twisted structures quickly unwind into layered structures that are more flat. As these structures are intercalated by absorbing more water, they swell unevenly into larger plates wherever they contact water. With uneven swelling between the layers, and assisted by some agitation, the layers exfoliate to almost individual sheets. The final step is to completely dissolve the swollen plate structures into individual molecular coils. In the hydration process, the swelling and exfoliation steps occur rapidly, usually in less than 10 seconds. The exfoliated plate dissolution step is much slower and also depends on the degree of agitation. The last step is the longest, usually accounting for about 50-70% of the total time for the complete hydration process.

It is known that the smaller the polymer particles, the more surface area that can contact the aqueous phase and the faster the hydration process. However, there have been several issues associated with the use of very small guar particles. Grinding the dry guar polymer can have a detrimental effect on the polymer performance because the grinding process can physically break the molecular chains and thus lower the polymer molecular weight and therefore lower the ultimate gel viscosity yield. In addition, the smaller the particle size, the harder it is to grind in terms of grinder geometry, energy input, heat dissipation control, and so on, which in turn lead to higher costs. Furthermore, when particles are small, they tend to form fish-eyes during hydration, where the outermost particles of an agglomerate quickly hydrate to a thick gelatinous material that encapsulates the interior particles of the agglomerate and prevents the water from entering into the core for further hydration. Thus, the knowledge that finer particles will potentially shorten hydration time has not led to effective improvements to reduce the time to complete the hydration process.

Historically, oilfield polymer solutions were gelled in batch mixing processes by which dry polymer was mixed with water in tanks large enough to hold all the fluid for a wellbore treatment. These batch treatment processes had numerous limitations since gel once made could decompose from bacteria, and any gel not used at the wellsite was wasted. Additionally, batch mixing did not readily allow for changes in gel concentrations or loading during the course of a treatment. Accordingly, numerous technologies have been developed to allow continuous mix of polymer solutions at a wellsite. A successful technique for gelling an aqueous fluid must meet several criteria, including but not limited to allowing accurate metering of polymer material into a water stream, producing hydrated polymer fluids with a minimum amount of equipment, while also avoiding the formation of fish-eyes when polymer particles contact water.

Continuous mix systems commonly in use typically use non-aqueous slurries or dry powder systems. Non-aqueous slurries comprise dry polymer suspended in an oil solvent, often diesel fuel which presents some difficulties. To minimize the use of oil suspensions, service companies have also developed dry systems in which dry polymer is directly mixed with water, but such systems can present another set of difficulties known to those of skill in the art. Some examples of complicated polymer hydration equipment are disclosed in U.S. Pat. No. 5,190,374, U.S. Pat. No. 5,382,411, U.S. Pat. No. 5,426,137 and U.S. 2004/0256106.

Similar difficulties are encountered when adding a friction reducer such as acrylamide homopolymer or copolymer to low viscosity fracturing fluids known as slickwater fluids, which typically contain only 0.025 to 0.2 weight percent of the friction reducer, in addition to other conventional additives such as biocides, scale inhibitors, clay stabilizers such as potassium chloride, trimethylammonium chloride or the like. Friction reducers are available commercially in oil or oil-and-water emulsions. To reduce turbulent flow in the slickwater fluid, the friction reducer must "flip" from the emulsion to rapidly dissolve in the water, usually within several seconds, or else the full drag reduction will not be achieved during transit through the wellbore. Surfactants have been used in the friction reducer emulsions to shorten the flip time. Also, dilution of the friction reducer in a brine solution has been used to collapse ionic polymer chains and reduce the viscosity of the concentrated friction reducer solution; however, storage stability has been an issue because any contact with fresh water, such as condensate dripping inside a storage tank, immediately forms fisheyes, which cannot be redispersed. It should be noted that the fisheyes form even thought the low viscosity brine-diluted polyacrylamide mixtures are clear solutions indicating no phase separation.

In the food industry, two-phase aqueous fluids are used to create polymer solutions that mimic the properties of fat globules. In the biomedical industry, such systems are exploited as separation media for proteins, enzymes, and other macromolecules that preferentially partition to one polymer phase in the mixture. When two or more different water soluble polymers are dissolved together in an aqueous medium, it is sometimes observed that the system phase separates into distinct regions. For example, this happens when two polymers at high concentration are chosen that are each water-soluble but thermodynamically incompatible with each other, e.g. polyethylene glycol (PEG) and dextran. Such two-phase systems are variously referred to in the literature as water-in-water emulsions, biphasic systems, aqueous two phase systems (ATPS) or the like. Although they may be referred to as emulsions they do not necessarily contain either oil or surfactant.

Although numerous continuous mix systems are now in the oilfield, none is completely satisfactory, and considerable need remains for systems with improved hydration properties. This need is met at least in part by the following invention.

SUMMARY OF THE INVENTION

Some embodiments of the present invention are based in part on the discovery that water-in-water or other solvent-in-solvent emulsions can be used to deliver polymers, especially rheology modifying polymers, to dense brines and other well treatment fluids. Where the dispersed phase comprises small polymer solution droplets or water-wet polymer particles, the emulsions behave rheologically much like a slurry of hard particles in the continuous phase. Thus, the apparent viscosity of the emulsion is influenced primarily by the rheology of the continuous phase, and not much at all by the viscosity of the dispersed phase. The term water-in-water emulsion as used herein is used to encompass mixtures comprising normally water-soluble polymers in the dispersed phase regardless of whether the dispersed phase is a liquid droplet of low or high viscosity polymer solution, or a paste-like or water wet polymer globule containing solid polymer particles, i.e. the water-in-water emulsion is applicable to both liquid-liquid mixtures and liquid-solid slurries comprising water-soluble polymers.

In an embodiment, the present invention uses a partitioning agent that severely limits the solubility of a rheological agent, such as a polymer. As a result, the mixture forms a water-in-water emulsion where a concentrated rheological agent is concentrated in the dispersed phase, as a viscous aqueous solution or as water-wet, hydrated, or partially hydrated particles, and the partitioning agent is concentrated in the continuous phase. One exemplary, non-limiting system comprises guar as the viscosifying agent and polyethylene glycol (PEG) as the portioning agent. Guar is commonly used to viscosify treatment fluids at relatively low concentrations, e.g. 0.1 weight percent, and at higher concentrations in water the fluid can become too thick to pump or pour. The water-in-water emulsion of concentrated guar in embodiments of the present invention has a relatively low viscosity and is very easily pumped, but when diluted with water at the wellsite, the binodal point is crossed and a continuous aqueous polymer phase forms to readily viscosify the fluid.

The concentrated guar embodiment thus has a low viscosity convenient for transport to the wellsite and/or preparation of the well treatment fluid, but thickens rapidly when diluted in the treatment fluid. Moreover, and unexpectedly, partitioning agents such as the PEG embodiment can be used effectively in the water-in-water emulsions at concentrations relative to the viscosifying polymer that, upon dilution in the well treatment fluid, are sufficiently low to minimize any deleterious effects on the treatment fluid in terms of, for example, rheology, stability, crosslinkability, and so on.

Another benefit of the water-in-water emulsion is that the mixture is easily flowable or pumpable, even though a comparable mixture of the water and polymer alone without any partitioning agent would be very thick or paste-like. This allows the water-in-water emulsion to be made at high polymer content and at the same time the polymer particles are contacted with the aqueous medium and at least partially water swollen, while at the same time dispersed in the aqueous partitioning agent solution. The swollen guar or other polymer in the water-in-water emulsion thus has a head start on the hydration process and can thus be hydrated in water or aqueous fluid more quickly relative to dry guar.

More importantly, the swollen guar in the water-in-water emulsion can be further processed in beneficial ways to additionally enhance rapid hydration. For example, mechanical processing such as wet grinding of the water-in-water emulsion can be used to break the guar particles into smaller pieces and thus achieve faster hydration, but without the problems noted above in the prior art dry grinding. The swollen guar particle is relatively larger and softer than the dry counterpart, which facilitates the grinding. In wet grinding, the heat generated can be dissipated in the liquid medium. Since the grinding is also cushioned by the fluid, there is less reduction of the polymer molecular weight. Furthermore, the progressively smaller particles formed during the wet grinding are already dispersed in water, and are not susceptible to form fish-eyes. Preheating the concentrated guar mixture can now be an efficient way to promote hydration since it is not necessary to heat the entire liquid phase of the well treatment fluid and the concentrate represents only a small fraction of the total fluid.

In one embodiment, the invention provides a method of treating a subterranean formation penetrated by a well bore. The method can include the steps of: (1) mixing a rheological polymer, a partitioning agent and a first liquid medium to form a heterogeneous mixture comprising a dispersed rheological polymer-rich phase and a partitioning agent-rich phase; (2) diluting the heterogeneous mixture with a second liquid medium miscible with the first liquid medium to mutually dissolve the polymer-rich phase and the partitioning-agent rich phase and form a well treatment fluid comprising a continuous mixed polymer-agent phase; and (3) injecting the well treatment fluid into the well bore. In embodiments, the rheological polymer can be a thickening polymer effective to increase the viscosity of the well treatment fluid; or a friction reducer effective to reduce friction pressure losses when the well treatment fluid is pumped in the well bore at a high flow rate, e.g. 4 m/s.

In embodiments, the continuous mixed polymer-agent phase has an apparent viscosity at 1 l/s and 25° C. that is greater than the bulk apparent viscosity of the heterogeneous mixture; an apparent viscosity at 10 l/s and 25° C. that is greater than the bulk apparent viscosity of the heterogeneous mixture; or an apparent viscosity at 100 l/s and 25° C. that is greater than the bulk apparent viscosity of the heterogeneous mixture.

In an embodiment, the first and second liquid media can be aqueous and the mixing step can further include at least partially hydrating the thickening polymer.

In an embodiment, the partitioning agent-rich phase can be continuous and the rheological-polymer-rich phase can be finely dispersed therein.

In embodiments, the first and second liquid media can be aqueous and the partitioning agent can comprise a water soluble polymer.

In an embodiment, the mixing step comprises a weight ratio of rheological polymer to partitioning agent from 1:4 to 4:1. The heterogeneous mixture can comprise from 2 to 20 percent by weight rheological polymer based on the weight of the liquid media in the heterogeneous mixture. The continuous mixed polymer phase can comprise from 0.01 to 1 percent by weight rheological polymer based on the weight of the liquid media.

In an embodiment, the partitioning agent can comprise a polymer soluble in the liquid media and having a solubility different with respect to the rheological polymer. Concentrated solutions of the rheological polymer and of the partitioning agent in the first liquid medium are preferably immiscible. In embodiments, the rheological polymer can be a polysaccharide; the partitioning agent a polyalkylene oxide. In a particular embodiment, the heterogeneous mixture can comprise polyethylene glycol and one or more of guar, guar derivative, cellulose, cellulose derivative, heteropolysaccharide, heteropolysaccharide derivative, or polyacrylamide in an aqueous medium.

In an embodiment, the first liquid medium is aqueous and the second liquid medium can be a high density brine. In another embodiment, the first and second liquid media can be aqueous, and the method can also include mechanically, thermally, or a combination of mechanically thermally processing the heterogeneous mixture effective to increase a rate of hydration of the polymer in the dilution step. The processing can include, for example, wet grinding, high shear mixing, ultrasonification, heating, or the like, or any combination thereof.

In an embodiment, the liquid media can be aqueous and the partitioning agent can include nonionic surfactant. Additionally or alternatively, the method can further comprise the step of dispersing a gas phase in the well treatment fluid to form an energized fluid or foam.

In another embodiment, the invention can provide a method of preparing a well treatment fluid, comprising the steps of: (1) mixing polyethylene glycol and one or more polymers selected from the group consisting of guar, modified guar, cellulose, modified cellulose, heteropolysaccharide, heteropolysaccharide derivative, or polyacrylamide, with a first aqueous medium to hydrate the one or more polymers and form a water-in-water emulsion; and (2) mixing the water-in-water emulsion with a second aqueous medium to form a well treatment fluid.

In embodiments, the water-in-water emulsion can comprise from 5 to 20 percent of the one or more polymers, by weight of the water in the emulsion. The well treatment fluid can comprise from 0.01 to 1 weight percent of the one or more polymers, by weight of the water in the well treatment fluid.

Another embodiment of the invention provides a method of preparing a polymer concentrate for use in a fluid for treating a subterranean formation penetrated by a well bore. The method for preparing the concentrate can include the steps of: (a) admixing a rheological polymer, a partitioning agent and a first aqueous medium to form a heterogeneous mixture comprising a dispersed polymer-rich phase and a partitioning agent-rich phase; and (b) mechanically, thermally, or mechanically and thermally processing the heterogeneous mixture to increase a rate of hydration of the polymer upon dilution. The processing step in various embodiments can include heating the heterogeneous mixture to a temperature above 60° C., wet grinding the heterogeneous mixture, high shear mixing of the heterogeneous mixture, e.g., at a shear rate above 1000 l/sec, ultrasonification of the heterogeneous mixture, or the like, including combinations thereof.

Another embodiment of the present invention provides the polymer concentrate prepared by the method described above. In an embodiment, the heterogeneous mixture can include from 5 to 20 percent of the rheological polymer, by weight of the water in the mixture, and a weight ratio of the partitioning agent to the thickening polymer from 1:4 to 4:1.

Another embodiment of the invention provides a method of preparing a well treatment fluid comprising mixing the polymer concentrate described above with a second aqueous medium to disperse the polymer in the resulting mixture. In an embodiment, the resulting mixture is completely dispersed within 90 seconds, preferably within 80, 70 or 60 seconds.

Another embodiment of the invention provides a method of treating a subterranean formation penetrated by a well bore comprising the steps of: (a) mixing the polymer concentrate described above with a second aqueous medium to disperse the polymer in the resulting mixture within 90 seconds, and (b) injecting the resulting mixture into the well bore.

Another embodiment of the invention provides a concentrated viscosifying additive for preparing a well treatment fluid, comprising a pumpable water-in-water emulsion of polyethylene glycol, one or more polymers selected from the group consisting of guar, modified guar, cellulose, modified cellulose, heteropolysaccharide, heteropolysaccharide derivative, or polyacrylamide, and one or more of an additament selected from the group consisting of proppants, fibers, crosslinkers, breakers, breaker aids, friction reducers, surfactants, clay stabilizers, buffers, similar additives used in fluids in the oil and gas industry and combinations thereof. In an embodiment, the water-in-water emulsion comprises from 5 to 20 percent of the one or more polymers, by weight of the water in the emulsion, and a weight ratio of the polyethylene glycol to the one or more polymers is from 1:4 to 4:1.

A further embodiment of the invention provides apparatus for preparing a well treatment fluid. The apparatus can include a solids feeder for supplying rheological polymer solids to a first mixing zone receiving a metered stream of a partitioning agent and a first aqueous stream to form a water-in-water emulsion stream. A dilution zone can be provided for mixing the water-in-water emulsion stream with a second aqueous stream to mutually dissolve the rheological polymer- and the partitioning agent and form a rheologically modified aqueous stream. The apparatus can also include a line for supplying the rheologically modified aqueous stream to a stirred header tank, and additive pumps for supplying one or more well treatment fluid additives to the header tank.

In an embodiment, the apparatus can also include a prehydration processing unit for the water-in-water emulsion stream before the dilution zone. The prehydration processing unit can include, for example, a wet grinder, a high shear mixer, a heater, an ultrasonic generator, or any combination thereof.

A further embodiment of the invention provides a method for supplying a hydrated polymer solution. The method can include the steps of: (a) supplying rheological polymer solids, a partitioning agent and a first aqueous stream to a mixing zone to form a water-in-water emulsion stream; (b) optionally mechanically, thermally or mechanically and thermally processing the water-in-water emulsion stream to improve hydratability of the rheological polymer; and (c) supplying the water-in-water emulsion stream with a second aqueous stream to a dilution zone to form a rheologically modified aqueous stream.

In another embodiment, the invention provides the well treatment fluid prepared by any one of the embodiments of the methods described above, including any combination or permutation of the individual method steps.

DESCRIPTION OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

This invention relates to fluids used in treating a subterranean formation, and in particular, the invention relates to the use of water-in-water emulsions to create concentrated polymer suspensions useful for creating wellbore fluids and in methods of treating subterranean formations. The invention is an improvement over the existing art by providing a concentrated polymer suspension which can be conveniently prepared, easily stored and/or transported, and accurately delivered to the treatment fluid with minimum equipment and dissolution time. In an unexpected discovery, the use of water-in-water emulsions may also serve as a significant improvement for viscosifying dense brines for oilfield use.

Some embodiments of the invention incorporate the concept of aqueous two-phase systems as delivery systems for pre-hydrated wellsite polymer concentrates. An advantage of the pre-hydrated concentrates in embodiments is the reduction or elimination of fish-eye formation which otherwise can occur when it is attempted to disperse the dry polymer in water. The presence of the partitioning agent in the preparation of the polymer concentrate inhibits the formation of a coating gel over the polymer particle aggregates, and even low shear mixing in many embodiments will readily disaggregate and disperse the polymer particles within the solution of the partitioning agent. In one embodiment where the partitioning agent is more slowly dissolved in water, the partitioning agent can be dissolved in water in advance of adding the polymer particles. In any case, since the polymer is already dispersed and all the surfaces contacted with water when the aqueous concentrate is formed, the risk that fish-eyes will form when the polymer is used at the wellsite is minimized. In one embodiment, the method of preparing a well treatment fluid or of treating a subterranean formation is free of the formation of fish-eyes.

Additionally, another important, unexpected discovery of the invention is that these pre-hydrated polymer concentrates can rapidly viscosify heavy brines. As used herein, a heavy brine, sometimes also called a high density brine or high brine, is an aqueous inorganic salt solution having a specific gravity of greater than about 1.02 kg/L (8.5 lb/gal (ppg)), 1.08 kg/L (9 ppg) or 1.14 kg/L (9.5 ppg), especially above 1.2, 1.32, 1.44 or 1.5 kg/L (10, 11, 12 or 12.5 ppg). This discovery suggests that the viscosification and other morphological characteristics of a fluid with a polymer are strongly influenced by the process by which the polymer is introduced, rather than simply the overall composition of the final fluid.

Another advantage of these water-in-water emulsion systems is that they are very tolerant to any accidental water entering the concentrate, such as, for example, condensation in a tote, whereas even small amounts of water present in non-aqueous polymer slurries or dry, free-flowing powder or granulated polymer systems can render the material unusable.

Some embodiments of the invention use a low viscosity, concentrated polymer solution for rapidly making polymer solutions at the wellsite with minimal equipment and horsepower. Although not limited to any specific theory or mechanism of operation, it is believed that the water-in-water emulsion allows the polymer to be dissolved or at least partially hydrated in a water phase without making an excessively viscous liquid carrier vehicle. This emulsion may be a phase-separated fluid in which a polymer, which may be a high molecular weight, water-soluble polymer, and a partitioning agent, which may also be a water-soluble polymer and/or a low molecular weight, water-soluble polymer, are dissolved in water to create a low viscosity mixture.

It is believed that the mixture has a low viscosity due to the continuous phase having a very low concentration of the rheological polymer, but the invention is not limited by this theory and is generally applicable to any polymer-concentrated, biphasic mixtures in a mutual solvent or solvent system wherein dilution with additional solvent rapidly dissolves the rheological polymer in a monophasic system. In one embodiment the polymer concentrate can have a lower viscosity than the corresponding polymer concentrate would have without the partitioning agent, i.e. dilution with additional solvent can thicken the polymer solution. Such a pre-hydrated concentrated solution or slurry, in the case of aqueous media, can be rapidly dispersed into another aqueous media, e.g. a water stream, to continuously make rheologically modified polymer solutions or gels for wellbore treatments. This can in an embodiment eliminate the disadvantages of dissolving a dry polymer powder, or using a polymer slurried in oil, or using an ionically collapsed polymer solution.

Some embodiments of the invention are based upon two-phase polymer-polymer systems achievable with polymers of interest to the oilfield, e.g. viscosifiers, friction reducers, etc. Also, these two phase systems can be exploited to create low viscosity pre-hydrated (in the case of aqueous solvent systems) or pre-solvated (in the case of non-aqueous solvents) concentrated mixtures to allow rapid polymer mixing at a well site.

Some examples of polymers useful in the invention include polymers that are either crosslinked or linear, or any combination thereof. Polymers include natural polymers, derivatives of natural polymers, synthetic polymers, biopolymers, and the like, or any mixtures thereof. An embodiment uses any viscosifying polymer used in the oil industry to form gels. Another embodiment uses any friction-reducing polymer used in the oil industry to reduce friction pressure losses at high pumping rates, e.g. in slickwater systems. Some non-limiting examples of suitable polymers include: polysaccharides, such as, for example, guar gums, high-molecular weight polysaccharides composed of mannose and galactose sugars, including guar derivatives such as hydropropyl guar (HPG), carboxymethyl guar (CMG), and carboxymethylhydroxypropyl guar (CMHPG), and other polysaccharides such as xanthan, diutan, and scleroglucan; cellulose derivatives such as hydroxyethyl cellulose (HEC), hydroxypropyl cellulose (HPC), carboxymethlyhydroxyethyl cellulose (CMHEC), and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers are preferably water soluble. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published application U.S. 2004209780.

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand.

In some cases, the polymer or polymers are formed of a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2 percent by weight or less by weight of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans in one embodiment comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to a α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

The selection of the partitioning agent depends on the polymer that is to be concentrated in the heterogeneous mixture, as well as the solvent system, e.g. aqueous, non-aqueous, oil, etc. In one embodiment in general, the partitioning agent is soluble in the solvent medium, but has dissimilar thermodynamic properties such that a solution thereof is immiscible with a solution of the polymer at concentrations above a binodal curve for the system, or such that a solid phase of the polymer will not dissolve in a solution of the portioning agent at the concentration in the system. For example, where the polymer is a high molecular weight hydrophilic polymer, the partitioning agent can be a low molecular weight hydrophobic polymer. For guar and polymers thermodynamically similar to guar, the partitioning agent in an embodiment is a polyoxyalkylene, wherein the oxyalkylene units comprise from one to four carbon atoms, such as, for example a polymer of ethylene glycol, propylene glycol or oxide, or a combination thereof, having a weight average molecular weight from 1000 to 25,000. As used herein, "polyoxyalkylene" and refers to homopolymers and copolymers comprising at least one block, segment, branch or region composed of oxyalkylene repeat units, e.g. polyethylene glycol. Polyethylene glycol (PEG) having a molecular weight between 2000 and 10,000 is widely commercially available. Other embodiments comprise methoxy-PEG (mPEG); poloxamers available as PEG-polypropylene oxide (PPO) triblock copolymers under the trade designation PLURONICS; alkylated and hydroxyalkylated PEG available under the trade designation BRIJ, e.g. BRIJ 38; and the like.

Other examples of partitioning agents can include polyvinyl pyrrolidone, vinyl pyrrolidine-vinyl acetate copolymers, and hydroxyalkylated or carboxyalkylated cellulose, especially low molecular weight hydroxyalkylated cellulose such as hydroxypropyl cellulose having a molecular weight of about 10,000.

Another embodiment of partitioning agents comprises the class of water soluble chemicals known as non-ionic surfactants. These surfactants comprise hydrophilic and hydrophobic groups, that is, they are amphiphilic, but are electrophilically neutral, i.e. uncharged. Nonionic surfactants can be selected from the group consisting of alkyl polyethylene oxides (such as BRIJ surfactants, for example), polyethylene oxide-polypropylene oxide copolymers (such as poloxamers or poloxamines, for example), alkyl-, hydroxyalkyl- and alkoxyalkyl polyglucosides (such as octyl or decyl glucosides or maltosides), fatty alcohols, fatty acid amides, and the like.

In an embodiment, the heterogeneous polymer concentrate can have any suitable weight ratio of rheological polymer to partitioning agent that provides a heterogeneous mixture, i.e. a binary liquid mixture or a solid-liquid slurry. If the ratio of polymer:partitioning agent is too high, the mixture becomes too thick to pour or pump, or may even form a paste; if too low, the partitioning agent upon dilution may have an adverse impact on the polymer solution or well treatment fluid. A polymer:partitioning agent ratio from 1:4 to 4:1 may be suitably employed, or higher or lower ratios may be used where the abovementioned disadvantages are avoided. In one embodiment, the polymer:partitioning agent ratio is from 1:2 to 2.5:1, preferably from 3:5 to 5:3.

The heterogeneous mixture can comprise anywhere upwards from 1 percent by weight rheological polymer, based on the weight of the liquid in the heterogeneous mixture, up to any maximum upper limit where the mixture is no longer fluid, e.g. pumpable or pourable using conventional oilfield pumping equipment. Lower concentrations of rheological polymer may provide little or no benefit because the dilution rate to obtain the treatment fluid is too low to be practical. For example, to prepare an aqueous treatment fluid with a polymer concentration of 0.5 weight percent, a 1 wt % concentrate would be mixed with water (or other liquid media) at 1:1 whereas a 20 wt % concentrate could be mixed at 40:1. In embodiments, the heterogeneous aqueous concentrate comprises a range of from a lower limit of 1, 2, 3 or 5 up to an upper limit of 10, 15 or 20 percent by weight of the polymer, by weight of the water or other liquid in the mixture.

The water-in-water emulsion may further include other additives such as dispersing aids, surfactants, pH adjusting compounds, buffers, antioxidants, colorants, biocides, which do not materially change the miscibility or solubility of the heterogeneous phases, or interfere with the desirable characteristics of the well treatment fluid. The polymer concentrate can include any additive that is to be introduced into the well treatment fluid separately, provided that it is essentially inert in the concentrate. In one embodiment, at least one other well treatment fluid additive is present in the polymer concentrate, such as, for example, proppants, fibers, cross-linkers, breakers, breaker aids, friction reducers, surfactants, clay stabilizers, buffers, and the like. The other additive can also be concentrated in the polymer concentrate so that the additive does not need to be added to the well treatment fluid separately, or can be added in a lesser amount. This can be advantageous where the other additive is usually added proportionally with respect to the polymer. Also, the activity of an additive(s) can be delayed, in one embodiment, and the delay can at least in part be facilitated where the additive is preferentially concentrated in the partitioning agent-rich phase or otherwise reactively separated from the polymer.

The water-in-water emulsion can also include or be mixed in a hydrophobic liquid, e.g. an oil-in-water or an invert (water-in-oil) emulsion wherein the aqueous phase in the oil emulsion comprises the water-in-water emulsion. In one embodiment, the oil-in-(water-in-water emulsion) emulsion can comprise a relatively high volume of oil in a discontinuous phase, for example, 90 volume percent or greater oil.

When incorporated in the well treatment or other fluid, for example upon dilution of the water-in-water polymer concentrates in a second aqueous medium, the viscosifying polymers may be present at any suitable concentration. In various embodiments hereof, the rheological polymer can be present in an amount of from about 0.01 g/L of fluid (0.1 lb/1000 gal of fluid (ppt)) to less than about 7.2 g/L (60 ppt), or from about 0.018 to about 4.8 g/L (about 1.5 to about 40 ppt), from about 0.018 to about 4.2 g/L (about 1.5 to about 35 ppt), or from 0.018 to about 3 g/L (1.5 to about 25 ppt), or even from about 0.24 to about 1.2 g/L (about 2 to about 10 ppt). Friction reducing polymers are generally diluted for use in the treatment fluid to a concentration from 0.01 to 0.4 percent by weight of the liquid phase, especially from 0.025 to 0.2 percent by weight of the liquid phase. In other embodiments, the polymer is diluted from the concentrate into the treatment or other fluid at a rate within a range of from any lower limit selected from 0.0001, 0.001, 0.01, 0.025, 0.05, 0.1, or 0.2 percent by weight of the liquid phase, up to any higher upper limit selected from 1.0, 0.5, 0.4, 0.25, 0.2, 0.15 or 0.1 percent by weight of the liquid phase.

Some fluid compositions useful in some embodiments of the invention may also include a gas component, produced from any suitable gas that forms an energized fluid or foam when introduced into an aqueous medium. See, for example, U.S. Pat. No. 3,937,283 (Blauer et al.) incorporated herein by reference. Preferably, the gas component comprises a gas selected from the group consisting of nitrogen, air, argon, carbon dioxide, and any mixtures thereof. More preferably the gas component comprises nitrogen or carbon dioxide, in any quality readily available. The gas component may assist in the fracturing and acidizing operation, as well as the well clean-up process.

The fluid in one embodiment may contain from about 10% to about 90% volume gas component based upon total fluid volume percent, preferably from about 20% to about 80% volume gas component based upon total fluid volume percent, and more preferably from about 30% to about 70% volume gas component based upon total fluid volume percent. In one embodiment, the fluid is a high-quality foam comprising 90 volume percent or greater gas phase. In one embodiment, the partitioning agent used in the polymer delivery system can be selected to enhance the characteristics of the energized fluid or foam, such as gas phase stability or viscosity, for example, where the partitioning agent is a surfactant such as a nonionic surfactant, especially the alkoxylated (e.g., ethoxylated) surfactants available under the BRIJ designation.

In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent ion such as, but not necessarily limited to, boron or a metal such as chromium, iron, aluminum, titanium, antimony and zirconium, or mixtures of polyvalent ions. The crosslinker can be delayed, in one embodiment, and the delay can at least in part be facilitated where the crosslinker or activator is concentrated or otherwise reactively separated in the partitioning agent-rich phase.

The fluids of some embodiments of the invention may include an electrolyte which may be an organic acid, organic acid salt, organic salt, or inorganic salt. Mixtures of the above members are specifically contemplated as falling within the scope of the invention. This member will typically be present in a minor amount (e.g. less than about 30% by weight of the liquid phase). The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In some embodiments of the invention, the electrolyte is an organic salt such as tetramethyl ammonium chloride, or inorganic salt such as potassium chloride. The electrolyte is preferably used in an amount of from about 0.01 wt % to about 12.0 wt % of the total liquid phase weight, and more preferably from about 0.1 wt % to about 8.0 wt % of the total liquid phase weight.

Fluids used in some embodiments of the invention may also comprise an organoamino compound. Examples of suitable organoamino compounds include, but are not necessarily limited to, tetraethylenepentamine, triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine, particularly when used with diutan viscosifying agent at temperatures of approximately 300° F.

Breakers may optionally be used in some embodiments of the invention. The purpose of this component is to "break" or diminish the viscosity of the fluid so that this fluid is even more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker (the borate anion), will allow the polymer to be crosslinked. Lowering the pH can just as easily eliminate the borate/polymer bonds. At pH values at or above 8, the borate ion exists and is available to crosslink and cause gelling. At lower pH, the borate is tied up by hydrogen and is not available for crosslinking, thus gelation caused by borate ion is reversible. Preferred breakers include 0.1 to 20 pounds per thousands gallons of conventional oxidizers such as ammonium persulfates, live or encapsulated, or potassium periodate, calcium peroxide, chlorites, and the like. In oil producing formations the film may be at least partially broken when contacted with formation fluids (oil), which may help de-stabilize the film. The breaker can be delayed, in one embodiment, and the delay can at least in part be facilitated where the breaker or breaker activator is concentrated or otherwise reactively separated in the partitioning agent-rich phase.

A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

Embodiments of the invention may also include placing proppant particles that are substantially insoluble in the fluids. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

Conventional propped hydraulic fracturing techniques, with appropriate adjustments if necessary, as will be apparent to those skilled in the art, are used in some methods of the invention. One preferred fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be a fluid of adequate viscosity. The pad and carrier fluids may contain various additives. Non-limiting examples are fluid loss additives, crosslinking agents, clay control agents, breakers, iron control agents, and the like, provided that the additives do not affect the stability or action of the fluid.

The procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most if not all commercial service companies that provide fracturing services to the oilfield have one or more fracture simulation models that their treatment designers use. One commercial fracture simulation model that is widely used by several service companies is known as FracCADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

In the fracturing treatment, fluids of the invention may be used in the pad treatment, the proppant stage, or both. The components of the liquid phase are preferably mixed on the surface. Alternatively, a the fluid may be prepared on the surface and pumped down tubing while the gas component could be pumped down the annular to mix down hole, or vice versa.

Yet another embodiment of the invention includes cleanup method. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore. While breakers are typically used in cleanup, the fluids of the invention may be effective for use in cleanup operations, with or without a breaker.

In another embodiment, the invention relates to gravel packing a wellbore. A gravel packing fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

In some embodiments of the invention, water-in-water emulsions are used to provide friction reducers, such as acrylamide polymers and copolymers having pendant cationic and/or anionic groups. By using the friction reducer as the rheological polymer in the water-in-water emulsion, the friction reducer can be provided as a stable concentrate that can rapidly flip when diluted with water to allow the polymer to become completely solubilized in an aqueous treatment fluid, especially a slickwater fluid where the friction reducer is added on the fly. Also, in many environments, it would be a particular advantage to be able to viscosify produced waters, river waters, and other "difficult waters" that contain high concentrations of salts or boron, and some embodiments of the invention include forming and treating a subterranean formation with a fluid formed of water-in-water emulsions of the invention and such produced waters, river waters, and other difficult waters.

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

EXAMPLES

Example 1

A low viscosity aqueous suspension of guar with PEG 8000. A series of polymer solutions was created by dissolving 0-4 weight percent dry guar and 0-4 weight percent dry polyethylene glycol (PEG 8000) in deionized (DI) water. In each case, 200 ml of DI water were used, and the polymers were measured as dry powders with percentages expressed on a total fluid weight basis. For each sample, the dry polymers were mixed together and then added together into the DI water while stirring vigorously in a WARING blender. Each sample was stirred rapidly in the blender for a minimum of one hour. After this stirring process, each sample was visually inspected for evidence of phase separation. Samples were monitored for a period of at least 24 hours to check for phase separation. The results were plotted in FIG. 1 using filled circles 10 to indicate no phase separation and open circles 12 to indicate the occurrence of phase separation.

Figure 1:
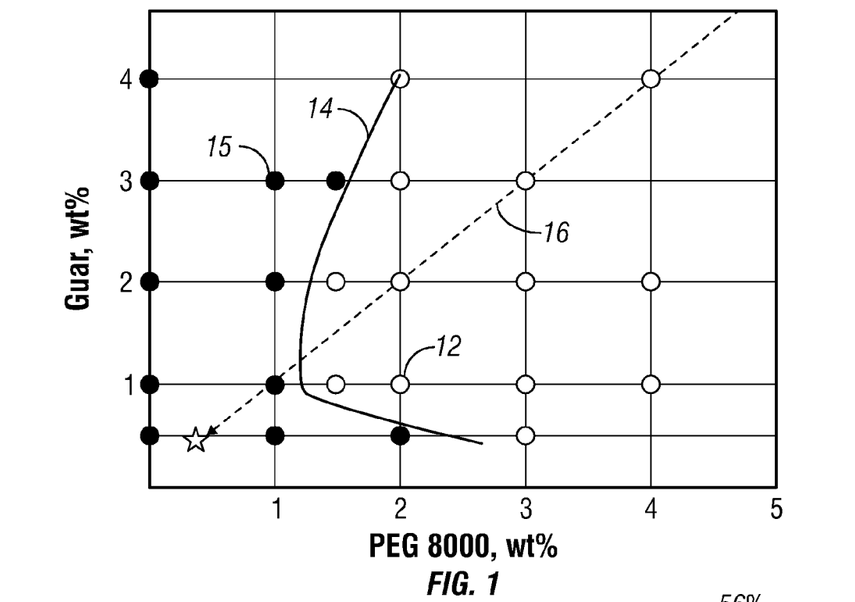
FIG. 1 illustrates an approximated binodal curve for the aqueous systems of guar and polyethylene glycol having a molecular weight of 8000 (PEG 8000) in deionized (DI) water, wherein filled circles indicate single-phase mixtures and open circles indicate biphasic mixtures comprising low-viscosity guar concentrates, and wherein the diagonal line represents an embodiment of a dilution path for making a 0.5 wt % guar solution from a 1:1 guar:PEG 8000 concentrate.

The low-viscosity concentrates 12 fell within the two-phase region demarcated by the binodal curve 14 approximated in FIG. 1. It should be pointed out that although these concentrations had considerable guar, they were not suspensions of dry guar in diesel or some other oil, since the guar was hydrated in water. When the guar concentrate was diluted with additional DI water to approximately 0.5 weight percent, it formed linear gel very rapidly without any fish-eye formation and without requiring an extensive hydration process, unlike a dry polymer addition or a dry polymer-oil slurry addition.

As an example, one series of fluids was made with 1 weight percent guar based upon total fluid weight, but with different amounts of PEG 8000, i.e. 0, 1, 1.5, 2, 3 and 4 weight percent based on total fluid weight. At the higher concentrations of PEG 8000 in FIG. 1, the samples were seen to phase separate over a period of a few hours, but no phase separation occurred for the lower PEG 8000 concentrations. When stirred, the phase-separated solutions 12 readily dispersed to provide low viscosity suspensions of guar polymer.

The diagonal line 16 thus represents an embodiment of a dilution path for making a 0.5 wt % guar gel from a 1:1 guar:PEG 8000 concentrate. It should be noted that the phase diagram in FIG. 1 does not suggest an upper limit as to the amount of polymer that can be concentrated in such a way. Pourable water-in-water emulsions with 20 wt % guar concentrations have been successfully formulated.

Example 2

Figure 2:
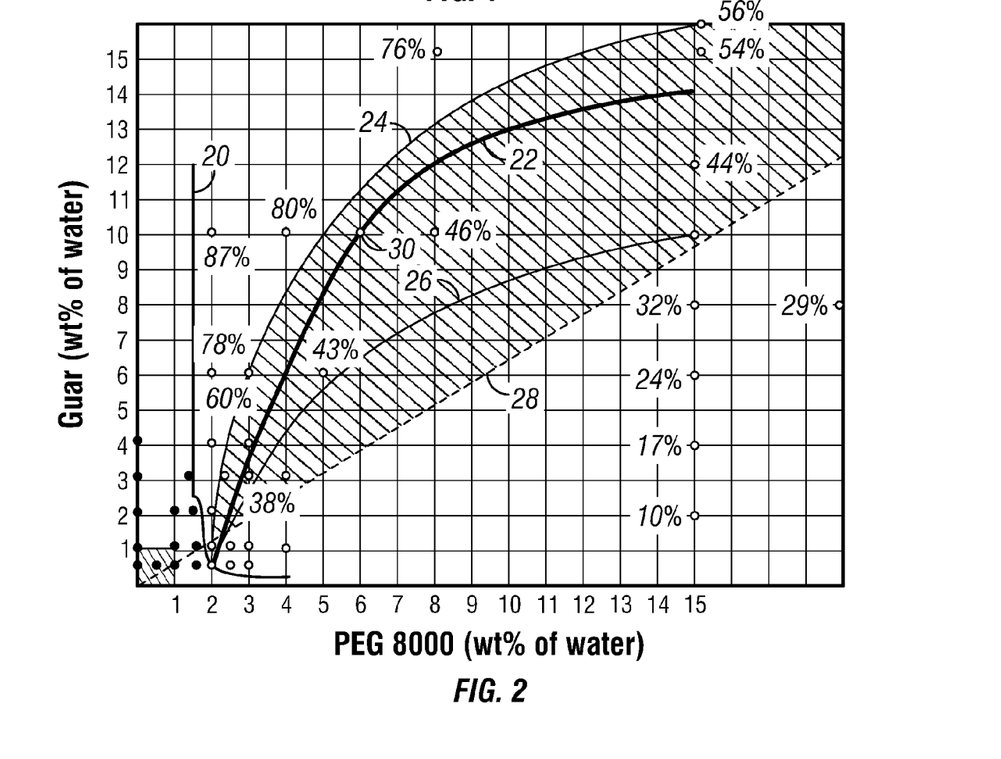
FIG. 2 illustrates a phase diagram for guar mixed with PEG 8000 in DI water including the binodal separating single-phase solutions from two-phase solutions; the equivolumetric biphase line indicating compositions where equilibrium phase separation results in two phases of equal volume, and wherein compositions above and below the equivolumetric biphase line form relatively larger and smaller concentrated guar phases; and one embodiment according to the invention of a limit line where the mixture can be diluted to 0.5 wt % guar without rheological changes due to the PEG 8000, corresponding to a weight ratio of guar:PEG 8000 of approximately 5:8.

Welsite guar delivery system using low viscosity aqueous suspension. FIG. 2 provides a phase diagram for a high molecular weight guar routinely used for wellbore treatment fluids. As in the phase diagram of FIG. 1, the guar in this example was again phase separated with PEG 8000. Line 20 on the phase diagram indicates the binodal for phase separation, with compositions to the upper-right of line 20 being low viscosity two-phase solutions of the two polymers in water. Line 22 in the two-phase region indicates the line of compositions having 50/50 phase volume upon phase separation; line 24 a 60/40 phase volume of guar:PEG 8000; and line 26 a 40/60 phase volume of guar:PEG 8000. The percentages beside some of the points are the volume percent of the separated guar phase at equilibrium. Below-right with respect to the line 24 (60/40 guar:PEG 8000) represents readily pourable compositions; compositions above 60 to about 80 volume percent guar phase are borderline pumpable, generally resembling applesauce in texture; and compositions above 80 volume percent guar phase generally have a paste-like consistency.

Limit line 28 represents an embodiment of the maximum PEG 8000 concentration where the mixture can be safely diluted to 0.5 wt % guar without rheological changes due to the PEG 8000, corresponding to a weight ratio of guar:PEG 8000 of approximately 5:8.

Although a wide range of low viscosity polymer concentrates have been identified in the phase diagram of FIG. 2, the composition 30 at 10% guar, 6% PEG 8000 was selected as an example point for demonstrating how an aqueous polymer concentrate can be used in a delivery system for making an exemplary treatment fluid. Composition 30 can be prepared offsite, delivered to the wellsite, and diluted approximately 20:1 with water to 0.5 weight percent guar and 0.3 weight percent PEG 8000. This example shows that, in some embodiments of the invention, use of two-phase polymer solutions for wellsite delivery has the unexpected result that the phase diagram yields a critical region in the phase space where linear guar solutions diluted from the concentrate are essentially indistinguishable from the same fluids made from only guar and water, in terms of rheology, stability or crosslinking properties. That is, the presence of a certain amount of PEG 8000 or other partitioning agent in the concentrate may not, upon dilution in the treatment fluid, measurably alter the rheology, stability or crosslinking properties of the guar in solution. The area 32 from zero to 1% for both guar and PEG concentration in FIG. 2 indicates such a region.

Example 3

Figure 3:
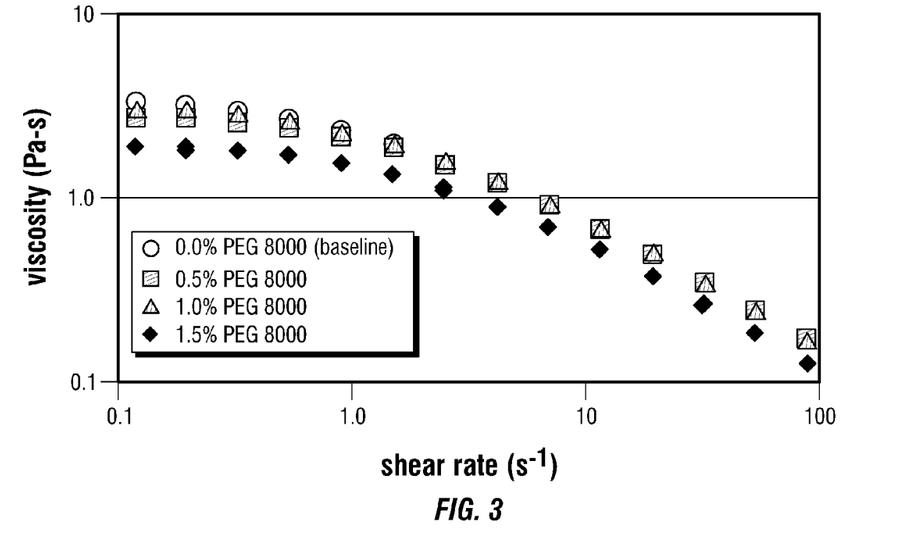
FIG. 3 shows the rheology of 0.5 wt % guar solutions with and without addition of PEG 8000, in terms of apparent viscosity versus shear rate, indicating that concentrations of PEG 8000 less than approximately 1 wt % do not measurably alter the rheology of 0.5 wt % guar solutions according to one embodiment of the invention.

Effect of diluted PEG 8000 on viscosity of linear gels. FIG. 3 shows the rheology of 0.5 wt % guar solutions with and without addition of PEG 8000, in terms of apparent viscosity versus shear rate. Concentrations of PEG 8000 less than approximately 1 wt % do not measurably alter the rheology of 0.5 wt % guar solutions. Specifically, the data shown in FIG. 3 illustrate that addition of PEG 8000 to a 0.5% guar solution (40 lbs/1000 gallons) has negligible impact on the guar solution rheology for PEG 8000 concentrations up to at least 1 wt %. This is a critical, unexpected result, that a phase-separated, low viscosity concentrate can be used to deliver guar as a treatment fluid, without sacrificing the performance of the guar fluid thus made when the dilution is performed to create a final fluid composition within the area 32 from zero to 1% for both guar and PEG concentration in FIG. 2.

Examples 4 and 5

Effect of guar concentrates in PEG 8000 on crosslinked treatment fluid properties. To investigate the usefulness of the guar concentrate for making treatment fluids and any adverse impact of the PEG 8000, crosslinked 0.3 wt % guar solutions were made two different ways. First, a baseline fluid (Example 4) was made from dry guar powder added to the fluid for comparison with the equivalent fluid made from an aqueous two-polymer concentrate. The baseline fluid was made and crosslinked in a standard treatment fluid formulation based upon de-ionized water (100 mL), 50% solution of tetramethyl ammonium chloride (0.2 mL), solution of 60% of sodium gluconate and 32% of boric acid (0.12 mL), and 30% solution of sodium hydroxide (0.08 ml). Second, for Example 5, the same fluid was made from an aqueous guar concentrate containing 10 wt % guar and 6 wt % PEG 8000, previously identified as composition 30 on the phase diagram of FIG. 2. By dilution, the second fluid contained 0.18 wt % PEG 8000, as well as 0.3 wt % guar, thereby placing it well within area 32 for dilution as identified in FIG. 2. As with the baseline fluid, this second fluid was crosslinked with a combination sodium gluconate, boric acid, and sodium hydroxide at a pH of approximately 10.

Figure 4:
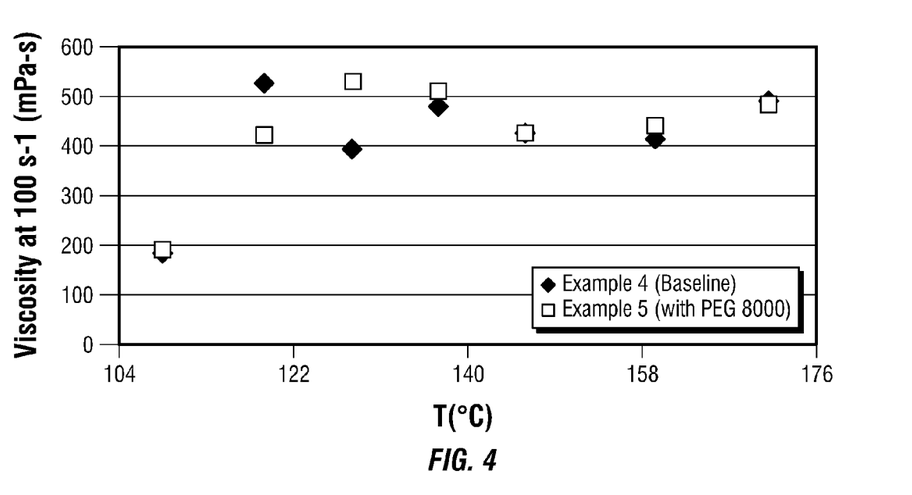
FIG. 4 shows the viscosities of the baseline Example 4 fluid prepared from dry guar and the inventive Example 5 fluid prepared from a guar concentrate with PEG 8000, both in an otherwise identical borate crosslinking formulation, at a shear rate of 100 $s^{-1}$ as the temperature of the sample was increased from room temperature to 79.4° C. (175° F.).
Figure 5:
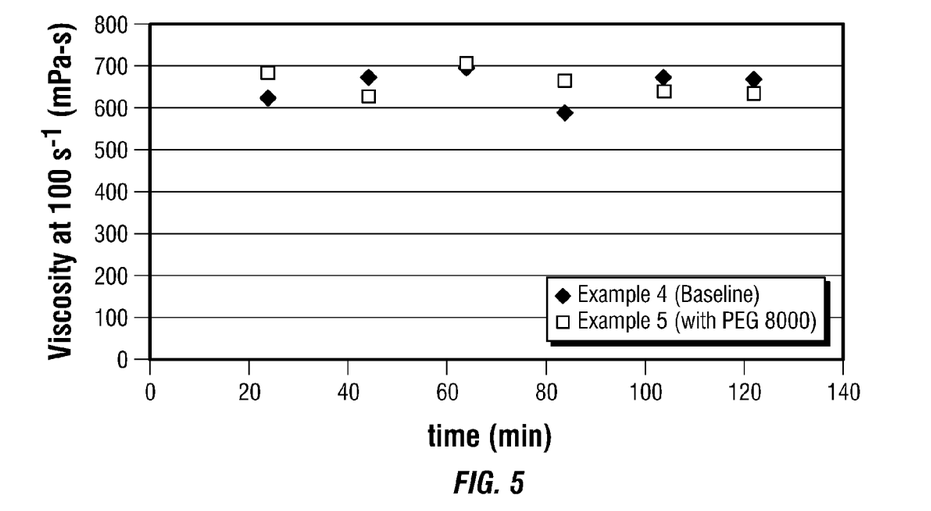
FIG. 5 shows the viscosities at 100 $s^{-1}$ of the Example 4 and 5 fluids from FIG. 4 were equivalent while the samples were held at the 79.4° C. (175° F.) temperature for two hours.

The viscosities of the baseline Example 4 fluid and the inventive Example 5 fluid at a shear rate of 100 s$^{-1}$ were continuously monitored as the temperature of the sample was increased from room temperature to 79.4° C. (175° F.). The results plotted in FIG. 4 indicate that the presence of the 0.18 wt % PEG 8000 in Example 5 had no measurable impact on the performance of the crosslinked guar made from the concentrate relative to the Example 4 baseline. Upon heating to 79.4° C. (175° F.), the samples were held at this temperature and the viscosity at 100 s$^{-1}$ continuously monitored. As shown in FIG. 5, the performance of the fluids of Example 4 (baseline) and Example 5 (with PEG 8000) were substantially equivalent.

Example 6

A low-viscosity aqueous suspension of diutan. A low-viscosity concentrated solution of diutan was formulated by combining diutan at 10 weight percent in DI water with 20 weight percent water soluble polymer comprising the sodium salt of polynaphthalene sulfonate-formaldehyde condensate, mol wt 8000, and 3 weight percent of a PEG-PPO-PEG triblock nonionic surfactant. This multi-polymer solution was mixed by first dissolving the water soluble polymer and surfactant in water for several minutes and then slowly adding the diutan polymer. Once all the diutan was added, the solution was mixed vigorously in a WARING blender for 1 hour to assure complete mixing and dissolution of the polymers. The final solution had a very low viscosity, was easily pourable, and slowly phase separated into diutan-rich and diutan-lean phases after sitting for approximately twelve hours. The phase-separated solution was easily resuspended, however, with gentle stirring. The 10 weight percent diutan solution was diluted into fresh water to rapidly make a viscous 1 weight percent diutan gel.

Examples 7-10

Rapidly viscosifying a heavy brine fluid with a pre-hydrated suspension of hydroxypropyl guar (HPG). In Examples 7 and 8, baseline runs using dry guar, 0.5 wt % HPG was measured as a dry powder and dispersed into $CaCl_2$ brine having a density of 1.318 g/mL (11.0 lb/gal or ppg) in a stirred WARING blender. In Example 7, the HPG had 0.6 molar substitution, JAGUAR HP-60; and in Example 8, HPG with 0.4 molar substitution, ECOPOL 400DS, was used. Mixing with HPG started at time 0 on the plot of FIG. 6 and continued for 2.5 minutes. Viscosity was measured with a Fann 35 viscometer at room temperature beginning at 5 minutes.

For Examples 9 and 10, a prehydrated HPG mixture was first prepared from 100 g DI water, 0.025 ml 50% aqueous solution of alkyl ($C_{12}$-$C_{16}$) dimethyl benzyl ammonium chloride, 10 g PEG 10K, and 4 g HPG. In Example 9, the HPG had 0.6 molar substitution, JAGUAR HP-60; and in Example 10, HPG with 0.4 molar substitution, ECOPOL 400DS, was used. These solutions were stirred until complete dissolution of the components created a pre-hydrated concentrate. Approximately 17 g of pre-hydrated concentrate was then added to 100 ml of the 1.318 g/mL (11.0 ppg) $CaCl_2$ brine to create a solution containing 0.5 wt % HPG in the brine. Mixing times and measurements were otherwise done in the same way as for the dry guar in Examples 7 and 8.

Figure 6:
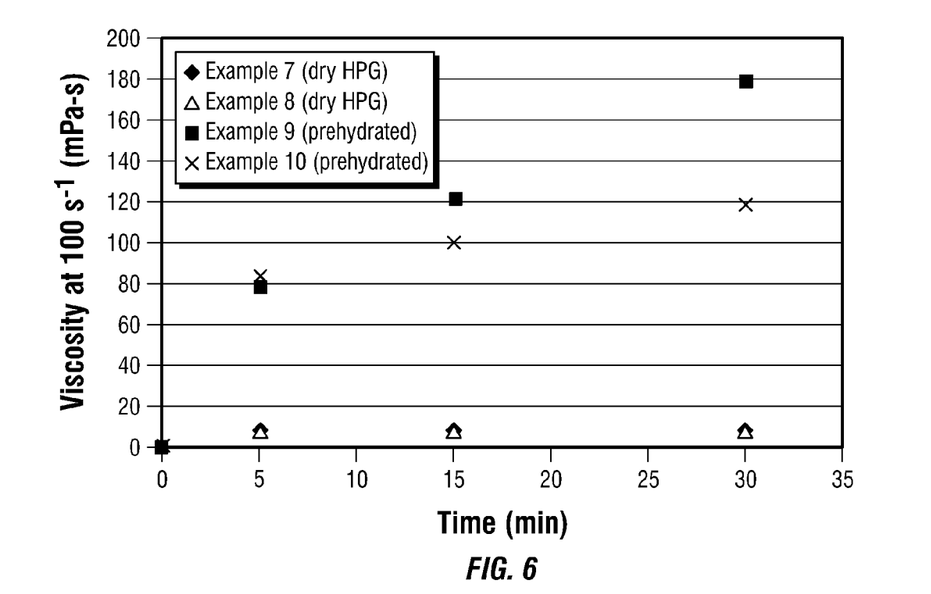
FIG. 6 shows the viscosities of two hydroxypropyl guars (HPG) of 0.6 and 0.4 degree of substitution injected into dense $CaCl_2$ brine as dry HPG for comparison and pre-hydrated HPG concentrates in water-in-water emulsions according to the present invention, as described in Examples 7-10, wherein each of the pre-hydrated HPG concentrate formulations generated viscosity rapidly, and addition of dry HPG to the brine showed very little viscosity development even after 30 minutes.

FIG. 6 compares the viscosity development of the two HPG guars injected into brine as dry and pre-hydrated concentrates. Each of the pre-hydrated concentrate formulations in Examples 9 and 10 generated viscosity rapidly and showed appreciable viscosification within 5 minutes of initial mixing. In contrast, addition of dry HPG to the brine in Examples 7 and 8 showed very little viscosity development after five minutes, and even after 30 minutes. In fact, after 30 minutes the viscosity of the dry guar formulations was an order of magnitude less than the viscosity of the formulations mixed from aqueous concentrates. An advantage of the prehydrated embodiments of Examples 9 and 10 is that the pre-hydrated concentrates rapidly viscosify heavy brines that otherwise would require the use of slow polymer hydration processes. Pre-hydration yields significant viscosity within 5 min, while direct hydration of dry guar into the brine may not yield significant viscosity even after 30 minutes.

Examples 11-16

Figure 7:
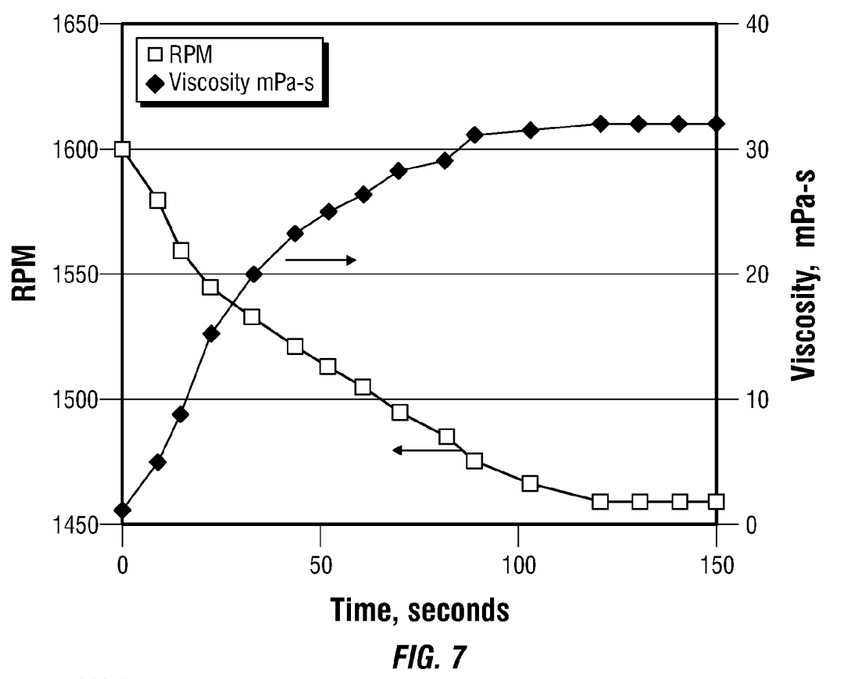
FIG. 7 shows the relationship between the rpm of a blender, charged with water at relatively constant power to which guar is added all at once, and the viscosity of the guar solution, as a function of time, as described in Example 11.
Figure 8:
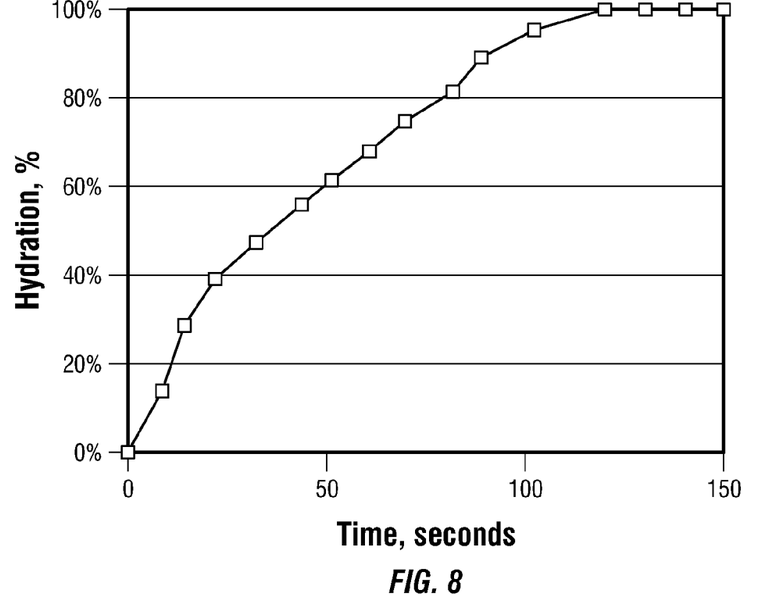
FIG. 8 shows the relationship between the percent hydration of the guar solution in FIG. 7 as a function of time, from which the percent hydration can be correlated to blender rpm, as described in Example 11.

Test procedure for determining percent hydration vs. rpm. In a WARING blender equipped with a tachometer to read the blender blade rotational speed, 500 mL of water were charged. Using the variable power setting, the rpm were set to a level to create a deep vortex but not so deep as to entrap too much air, which was determined to be in the range of between 1500-1600 rpm, and this setting was used throughout the following examples. Dry rheological polymer such as guar with a size <40 mesh (Example 11) was then added to the blender all at once, and as the polymer hydrated, the fluid became viscous and harder to stir, and the rpm of the blender decreased, as shown in FIG. 7. These data were than used to derive from the rpm change a hydration curve as the percent hydration of the polymer as a function of time, as shown in FIG. 8.

For Example 12, this hydration procedure was repeated with the same amount of polymer in the form of a water-in-water emulsion which was first prepared separately in a WARING blender based on composition 30 in FIG. 2 and Example 2 described above, i.e. a mixture of 10% polymer and 6% PEG 8000. For a dilution of 20:1 in the 500 ml water charged to the blender, 25 ml of the concentrate was added at t=0.

Figure 9:
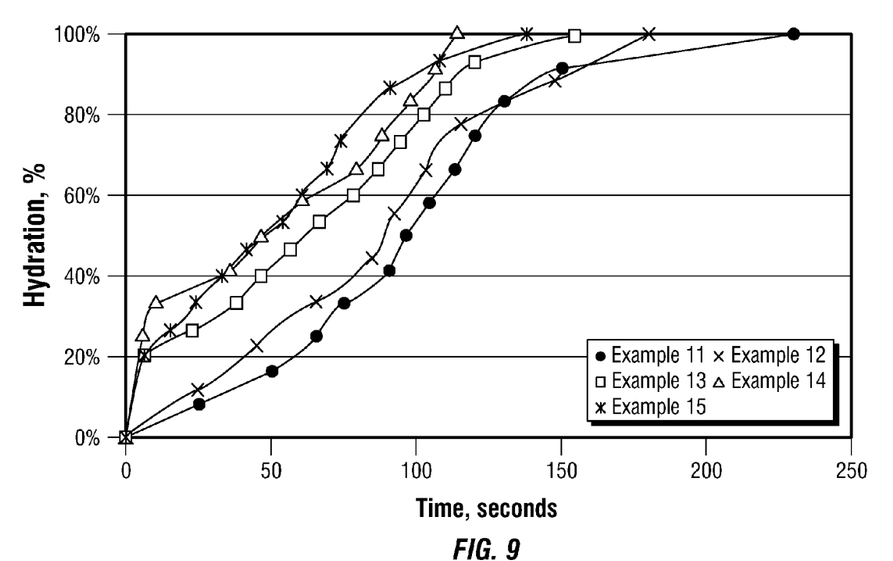
FIG. 9 compares the hydration curves for: dry guar (Example 11, comparative); a water-in-water emulsion of 10 wt % guar and 6 wt % PEG 8000 prepared in a WARING blender (base WIWE, Example 12, inventive); the base WIWE processed with a SILVERSON high shear mixer for 10 minutes (Example 13, inventive); the base WIWE processed with a SILVERSON high shear mixer for 20 minutes (Example 14, inventive); and the base WIWE processed with an electric mortar for 10 minutes (Example 15, inventive), as described in Examples 11-15, according to embodiments of the invention.
Figure 10:
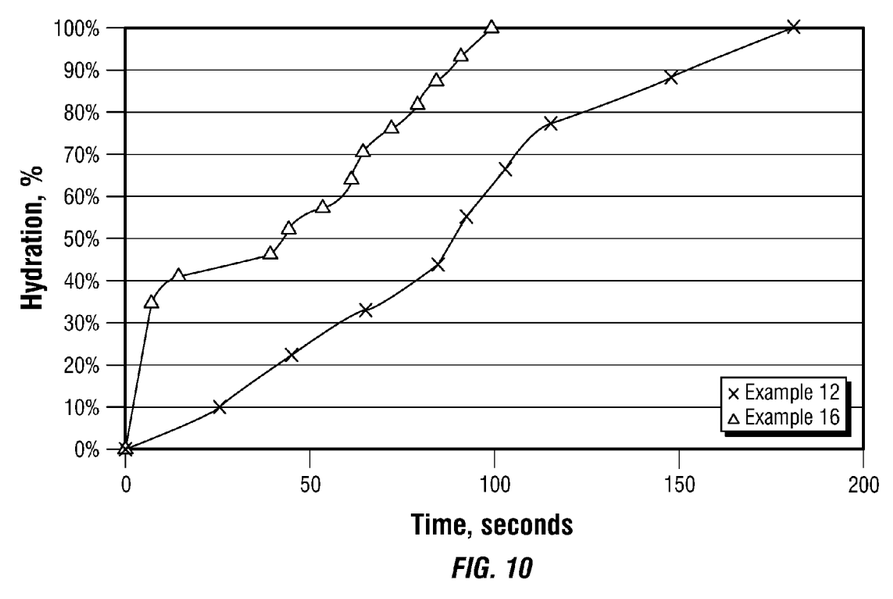
FIG. 10 compares the hydration curves for a water-in-water emulsion of 10 wt % guar and 6 wt % PEG 8000 prepared in a WARING blender (base WIWE), and the base WIWE preheated to 65.6° C. (150° F.), as described in Examples 12 and 16, according to embodiments of the invention.

For Examples 13 and 14, the water-in-water emulsion of composition 30 was processed with a SILVERSON high shear mixer for 10 minutes and 20 minutes, respectively. For Example 15, the guar concentrate of composition 30 was processed by wet grinding with an electric mortar for 10 minutes. These processed water-in-water emulsion samples were then used to develop hydration curves using the procedure of Example 12. FIG. 9 shows the hydration curves for Examples 11-15. As indicated, the hydration rate of the base water-in-water emulsion (Example 12) was equivalent to or improved slightly over the dry polymer (Example 11). Grinding or shearing the water-in-water emulsion with either a high-shear mixer (Examples 13-14) or an electric mortar (Example 15) resulted in faster hydration.

For Example 16, the guar concentrate of composition 30 was heated to 65.6° C. (150° F.) just before addition to the room temperature water (500 ml) in the blender. FIG. 7 shows the improvement on hydration of Example 16 achieved by heating the water-in-water emulsion before the hydration test, compared to the base emulsion without preheating (Example 12). Note the heating was with a highly concentrated slurry, which accounted for about 5 wt % of the total final hydrated gel, i.e. a 95% reduction in heating requirements compared to heating the entire mixture of the pre-gel components.

Example 17

Figure 11:
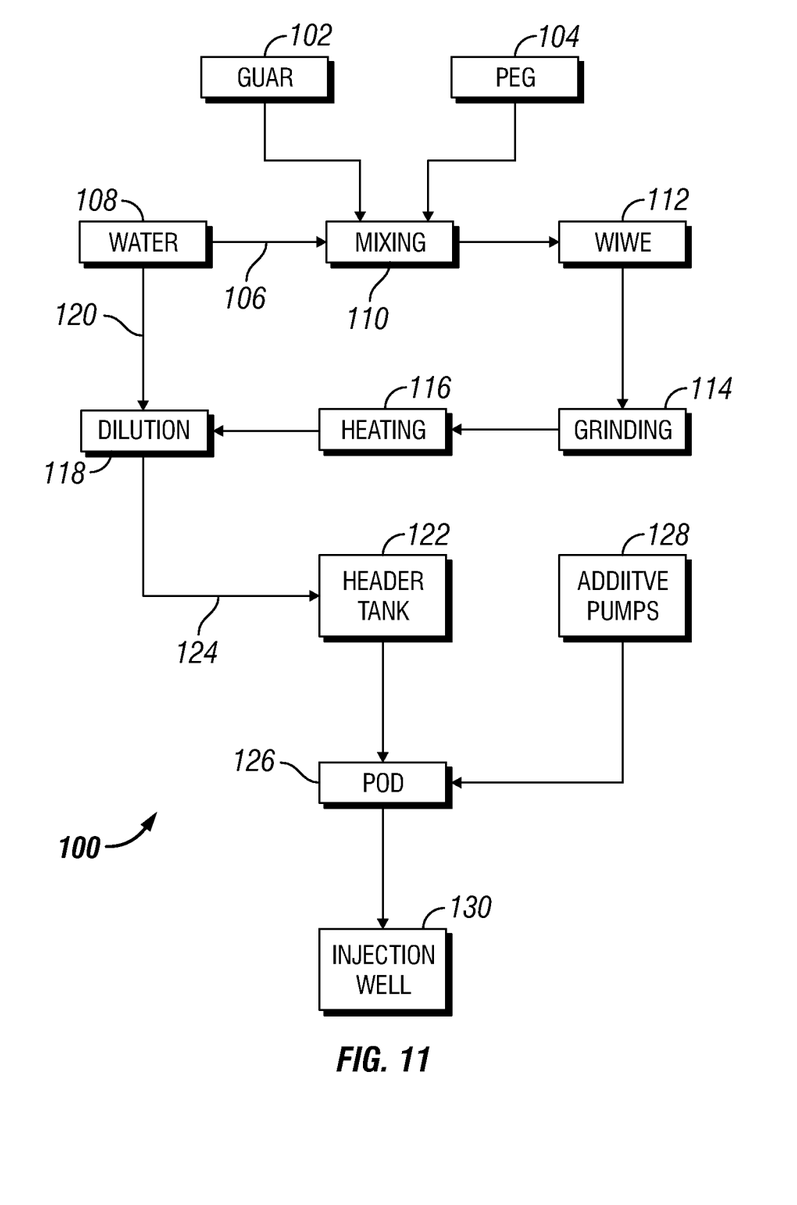
FIG. 11 shows a schematic flow diagram for wellsite preparation of a polymer gel in a well treatment fluid, based on dry guar powder via a water-in-water emulsion process for prehydration, as described in Example 17, according to an embodiment of the invention.

Wellsite hydration process using water-in-water emulsion. FIG. 11 shows an example of a flow diagram for equipment to implement a hydration process 100 using water-in-water emulsion technique. Dry guar 102 and PEG 8000 104, which can be a dry powder, aqueous solution or slurry, are supplied together with a first stream 106 of water 108 to mixing zone 110, which can be an inline, batch or continuous mixer for mixing liquids and solids. The water-in-water emulsion can be optionally stored in an emulsion holding tank 112. The emulsion is then processed in grinding zone 114 and/or heating zone 116 for prehydration enhancement. This allows efficient energy use to process a relatively small stream, where one of the previously infeasible approaches to hydrate guar are used, for example, high shear, heating, or ultrasonic vibration (not shown). The processed emulsion is then supplied to dilution zone 118 where it is diluted with second water stream 120 to form the gel which is then received in optional header tank 122 and with sufficient residence time in the line 124 and/or tank 122 for complete hydration, supplied to an otherwise conventional POD metering system operatively associated with additive pumps 128 and wellhead 130. The ratio of the first water stream 106 to the second water stream 120 is about 1:20 in one embodiment.

Examples 18-19

Polyacrylamide friction reducer concentrates. A solution was made by adding 2% by weight KCL to distilled water. For Example 18, 7.5 weight percent of 7000 molecular weight polyethylene glycol was then added to the KCl solution. Then 20% by weight of high molecular weight polyacrylamide was added to the solution. The solution was stirred. The resulting mixture had water like viscosity. For Example 19, 7.5 weight percent of BRIJ 38 polyoxyethylene was added to the 7.5 wt % KCl solution, followed by 20% by weight of the high molecular weight polyacrylamide was added to the solution. The solution was stirred and the resulting mixture again had water like viscosity.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of preparing a polymer concentrate for use in a fluid for treating a subterranean formation penetrated by a well bore, comprising:
    a. in a first step, admixing a rheological polymer, a partitioning agent and a first aqueous medium comprising water to form a heterogeneous mixture comprising:
        a partitioning agent-rich phase comprising water and at least a portion of the partitioning agent, wherein the partitioning agent-rich phase is continuous and
        a dispersed polymer rich phase finely dispersed in the partitioning agent-rich phase, wherein the dispersed polymer-rich phase comprises water and at least a portion of the rheological polymer;
    b. mechanically, thermally, or mechanically and thermally processing the heterogeneous mixture to increase a rate of hydration of the polymer upon dilution in a second aqueous medium,
    wherein the heterogeneous mixture is a liquid-liquid mixture.

2. The method of claim 1 wherein the processing step comprises heating the heterogeneous mixture to a temperature above 60° C.

3. The method of claim 1 wherein the processing step comprises wet grinding the heterogeneous mixture.

4. The method of claim 1 wherein the processing step comprises high shear mixing of the heterogeneous mixture.

5. The method of claim 1 wherein the processing step comprises ultrasonification of the heterogeneous mixture.

6. The method of claim 1, wherein the heterogeneous mixture comprises from 5 to 20 percent of the rheological polymer, by weight of the water in the mixture, and a weight ratio of the partitioning agent to the thickening polymer is from 1:4 to 4:1.

7. A method for supplying a hydrated polymer solution, comprising:
    a. supplying rheological polymer solids, a partitioning agent and a first aqueous stream comprising water to a mixing zone to form a water-in-water emulsion comprising:
        a partitioning agent-rich phase comprising water and at least a portion of the partitioning agent, wherein the partitioning agent-rich phase is continuous, and
        a rheological polymers solids-rich phase finely dispersed in the partitioning agent-rich phase, wherein the rheological polymers solids-rich phase comprises water and at least a portion of the rheological polymer solids;
    wherein the water-in-water emulsion is a liquid-liquid mixture;
    b. optionally mechanically, thermally or mechanically and thermally processing the water-in-water emulsion stream to improve hydratability of the rheological polymer;
    c. supplying the water-in-water emulsion stream with a second aqueous stream to a dilution zone to form a rheologically modified aqueous stream.

8. The method of claim 7 wherein the processing step comprises heating the water-in-water emulsion to a temperature above 60° C.

9. The method of claim 7 wherein the processing step comprises wet grinding the water-in-water emulsion.

10. The method of claim 7 wherein the processing step comprises high shear mixing of the water-in-water emulsion.

11. The method of claim 7 wherein the processing step comprises ultrasonification of the water-in-water emulsion.

* * * * *